United States Patent [19]

Christman

[11] 4,248,287
[45] Feb. 3, 1981

[54] METHOD OF AND APPARATUS FOR MAKING FLOTATION TIRE AND TIRE PRODUCT

[75] Inventor: Harold E. Christman, Santa Cruz, Calif.

[73] Assignee: Brad Ragan, Inc., Spruce Pine, N.C.

[21] Appl. No.: 849,663

[22] Filed: Nov. 8, 1977

[51] Int. Cl.³ .................. B60C 9/14; B60C 11/05
[52] U.S. Cl. ..................... 152/354 R; 152/361 R; 156/129
[58] Field of Search ........... 152/354, 356, 359, 361 R; 156/96, 129

[56] References Cited

U.S. PATENT DOCUMENTS

| | | | |
|---|---|---|---|
| 885,219 | 4/1921 | Bayne et al. | 152/354 |
| 2,939,502 | 6/1960 | Hindin et al. | 152/361 R |
| 3,550,667 | 12/1970 | Bartley | 152/361 |
| 3,850,219 | 11/1974 | Snyder | 152/354 |
| 3,999,585 | 12/1976 | Grawey | 152/354 |

FOREIGN PATENT DOCUMENTS

867541  9/1957  United Kingdom ................... 152/361

*Primary Examiner*—L. J. Paperner
*Assistant Examiner*—Lawrence E. Williams
*Attorney, Agent, or Firm*—Bell, Seltzer, Park & Gibson

[57] ABSTRACT

A hoop tread, radial carcass flotation tire is constructed in accordance with a method and through the use of apparatus which impart controlled carcass flexing characteristics while accommodating axle drive of the tire. The method includes constructing a tire carcass with radially directed cords in sidewall portions and with circumferentially directed cords in a tread face portion. The apparatus comprises a mandrel assembled by mounting a plurality of segments about an axle and used to support plies of material during carcass construction. The tire is capable of "floating" over loose or easily damaged supporting surfaces including growing crops in agricultural fields without injury or damage to the supporting surface.

6 Claims, 20 Drawing Figures

Fig-7 ASSEMBLE MANDREL SEGMENTS

Fig-8 COVER WITH PAPER, THEN LAYER OF BUTYL RUBBER

Fig-9 APPLY FIRST LAYER OF RADIAL STRIPS LAYERS 3,5,7 and 9 SAME AS ABOVE

Fig-10 APPLY SECOND LAYER OF CIRCUMFERENTIAL STRIPS LAYERS 4,6 and 8 SAME AS ABOVE Fig-11 APPLY BEADS

Fig-12

Fig-13 Add Sidewall Shaping Flanges

Fig-14

Fig-15 Bias Wrap Entire Tire Carcass

Fig-16 Cure

Fig-17 Unwrap - Remove Flanges - Build Up Shoulders - Apply Tread

METHOD OF AND APPARATUS FOR MAKING FLOTATION TIRE AND TIRE PRODUCT

This invention relates to flotation tires and to methods and apparatus for manufacturing such tires. As herein used, "flotation tires" refers to tires which, as compared with conventional tires, have a wider cross section, a larger air volume, a more flexible carcass, and operate at lower inflation pressures. Such characteristics give flotation tires a large "footprint" in contact with a supporting surface and distribute vehicle load over a large area at low unit pressure. Such an effect is referred to as "flotation" and vehicles which rely upon such effects are known as "flotation vehicles". Flotation vehicles, as are coming to be more widely used in agriculture, permit driving over growing crops in agricultural fields without injury to the crops or driving over other damage susceptible or loose surfaces such as arctic tundra or desert sand. Flotation tires and vehicles, as known heretofore, have been described and shown in various prior patents and publications available to the interested person skilled in the arts of tire manufacture and/or use and thus the present description of such previously known tires and vehicles will not here be unduly extended.

Certain types of flotation tires and flotation vehicles heretofore used have provided for mounting of flotation tires on vehicles having driven axles. Particularly in such circumstances and where the flotation tires employed have generally transversely extending lugs or ribs, a number of substantial difficulties have been encountered. First, while the relatively low pressures employed achieve flotation operation, the transversely extending lugs or ribs give rise to extreme vibration when vehicles mounting such tires are operated over any reasonably compacted or hard surface. Further, the transmission of tractive force or driving power through an axle, a wheel rim, and the bead portions of the flotation tire has been known, with tires having transversely extending lugs or ribs, to exceed the force of engagement between the tire carcass and wheel rim. In such event, the wheel rim rotates or spins within the tire, wearing and eventually destroying the tire bead portions.

In part due to such difficulties, prior flotation tires have been subjected to extreme use limitations by the manufacturers of such tires. More particularly, tire inflation is specified precisely and a ceiling is placed upon permissible vehicle speed. Notwithstanding such limitations, the difficulties mentioned above are still encountered. Further, it has been noted that tread wear of such flotation tires is unevenly distributed, with little or no wear of lugs at the shoulder and center of the tread face. Lug wear occurs in two zones, each of about one quarter of the width of the tire and located approximately one eighth of the tire width from the sidewall portions.

With the aforementioned difficulties and deficiencies of prior flotation tires particularly in mind, it is an object of this invention to provide a flotation tire capable of operation on an axle driven wheel rim and which overcomes and obviates the difficulties of prior tires as mentioned above. In realizing this object of the present invention, a flotation tire is constructed which has characteristics of carcass flexibility such that the desired flotation effect is achieved while wear is more uniformly distributed and excessive limitation on tire use is avoided.

A further object of the present invention is the provision of a method of making a flexible sidewall flotation tire for mounting on a rim of an axle driven wheel by which desired characteristics of carcass flexibility are imparted to the tire produced. In realizing this object of the present invention, a plurality of layers of cord containing, unvulcanized elastomeric material sheet are built-up about a rigid mandrel while arranging the layers in predetermined relation one to another.

Yet another object of the present invention is to provide apparatus for use in making flexible sidewall flotation tires which accommodates building up a tire carcass of a plurality of layers of elastomeric material while achieving a particular desired carcass cross sectional configuration. In realizing this object of the present invention, a plurality of substantially uniform, rigid mandrel segments are attached about a mounting axle and cooperate with a pair of sidewall shaping flanges for shaping elastomeric material sheet built-up thereabout into a particular predetermined tire carcass cross-sectional configuration.

Some of the objects of the invention having been stated, other objects will appear as the description proceeds, when taken in connection with the accompanying drawings, in which.

While the present invention will be described hereinafter with particular reference to the accompanying drawings, it is to be understood at the outset of the description which follows that it is contemplated that the present invention may be varied in specific detail while still achieving the desirable characteristics and features of the present invention. Accordingly, the description is to be understood as a broad enabling teaching directed to persons skilled in the applicable arts of flotation tire manufacture and use, and is not to be understood as restrictive.

Figure 1:
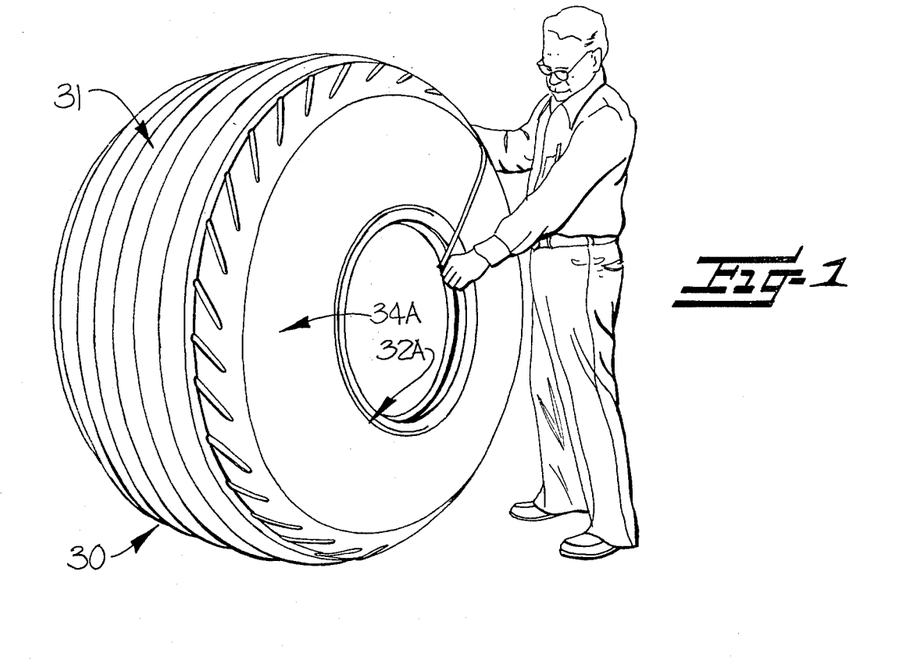
FIG. 1 is a perspective view of a flotation tire in accordance with the present invention.

Referring now more particularly to FIG. 1, a flexible sidewall flotation tire in accordance with the present invention is there shown generally at 30. In accordance with the present invention, the flotation tire 30 is adapted for mounting on a rim of an axle driven wheel. However, it is also contemplated that the tire 30 may be driven circumferentially, as has been known heretofore with certain prior flotation tires. As pointed out more fully hereinafter, the tire 30 includes a tread generally indicated at 31 for engaging a traction surface such as the ground or a hard surface road and a carcass for supporting the tread 31. The carcass has a pair of spaced bead portions for engaging a rim (one of which is indicated at 32A in FIG. 1), a pair of sidewall portions extending from respective bead portions for imparting flexibility to the tire (one of which is indicated at 34A in FIG. 1) and a tread bearing portion (indicated at 35 in FIG. 2) extending between the sidewall portions for supporting the tread 31. In accordance with the present invention and as described more fully hereinafter, each of the sidewall portions is defined by a plurality of built-up superposed layers of cord containing elastomeric material sheet with the layers arranged with cords therein directed generally radially from the bead portions. The tread bearing portion of the tire carcass is defined by a plurality of built-up superposed layers of cord containing elastomeric material sheet with some layers arranged with cords therein directed circumferentially about the carcass and the remainder of the layers arranged with cords therein crossing circumferential cords at a right angle. By reason of the hoop-like tread 31 encircling the carcass and the construction of the carcass in the sidewall and tread bearing portions as described above, carcass flexibility is enhanced in the sidewall portions and fully controlled in the tread and tread bearing portion. Consequently, the desired large "footprint" and flotation effect are maintained even through variations in vehicle load and tractive force exerted through the tire 30. Further, and as described more fully hereinafter, avoidance of vibration and damage to crops, loose soil and the like are facilitated.

In making the flexible sidewall flotation tire 30 of FIG. 1, a rigid mandrel (indicated at 36 in FIGS. 5 and 6) having a central axis and spaced sidewall surfaces 38 generally perpendicular to the axis is provided for receiving the layers of elastomeric material sheet from which the tire carcass is built-up. The rigid mandrel 36 includes a generally right circular cylindrical main body surface 39 co-axial with the central axis thereof and joining the sidewall surfaces 38. The mandrel is formed (as shown more particularly in FIGS. 3 through 6) by a mounting axle means defining a central axis and having a pair of mounting flanges generally perpendicular to the axis and spaced one from another therealong. The mounting axle means preferably takes the form of a male member 40 (FIG. 3) and a cooperating female member 41, each of which has an axial length sufficient to ensure telescopic interengagement thereof. Each of the male and female members 40, 41 includes a hub portion 42, 43 for receiving a cooperating collar 44, 45 secured to a shaft 48 by which the rigid mandrel and the tire being built thereupon may be manipulated. By way of example, the shaft 48 may be mounted in a building frame apparatus generally indicated at 49 (FIG. 2) and be driven in rotation by an appropriate drive motor, generally indicated at 50, during a tire building process.

The rigid mandrel further includes a plurality of substantially uniform segments 51 (FIGS. 3 through 6) for attachment to the mounting flanges 40A, 41A of the male and female members 40, 41 of the mounting axle means. When assembled with the mounting axle means, the segments provide a rigid mandrel for receiving a tire carcass built-up thereabout in a plurality of layers of elastomeric material sheet and together define the spaced sidewall surfaces 38 generally perpendicular to the central axis (as defined by the shaft 48) and the generally right circular cylindrical main body surface 39 co-axial with the axis and joining the sidewall surfaces. As indicated in FIG. 5, each of the segments 51 defines a predetermined arcuate portion of respective sidewall and main body surfaces.

Figure 4:
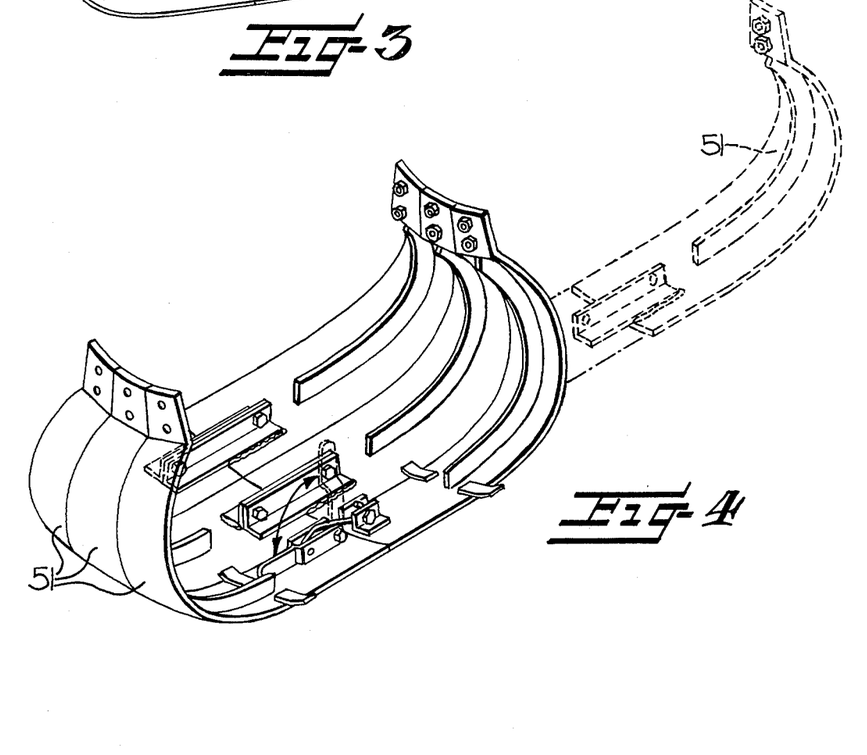
FIG. 4 is a perspective view, partly exploded, showing portions of the apparatus components of FIG. 3.

Preferably, and as illustrated, each segment 51 is assembled from a symmetrical pair of metal elements, such as may be formed of cast aluminum. Most of the segments 51 have the elements joined by a hinge located medially of the main body surface 39 defined by the cooperating elements. By means of such a hinge, the elements of a segment may be folded one relative to the other. A minority of the segments 51, such as from two to five segments, function as "key" segments as described more fully hereinafter and are provided with a separable connection permitting the elements to be either latched into fixed relation one to the other or separated entirely. Three such key segments 51 are indicated in FIG 4, where the provision of a latch and means for separating the elements of the segments one from the other are indicated.

The apparatus further comprises a pair of sidewall shaping flanges 52, 54 (FIG. 3) for attachment to the axle means and for defining with the sidewall surfaces 38 of the segments 51 a volume for shaping elastomeric material sheet into a predetermined tire carcass sidewall portion configuration, as described more fully hereinafter.

Figure 5:
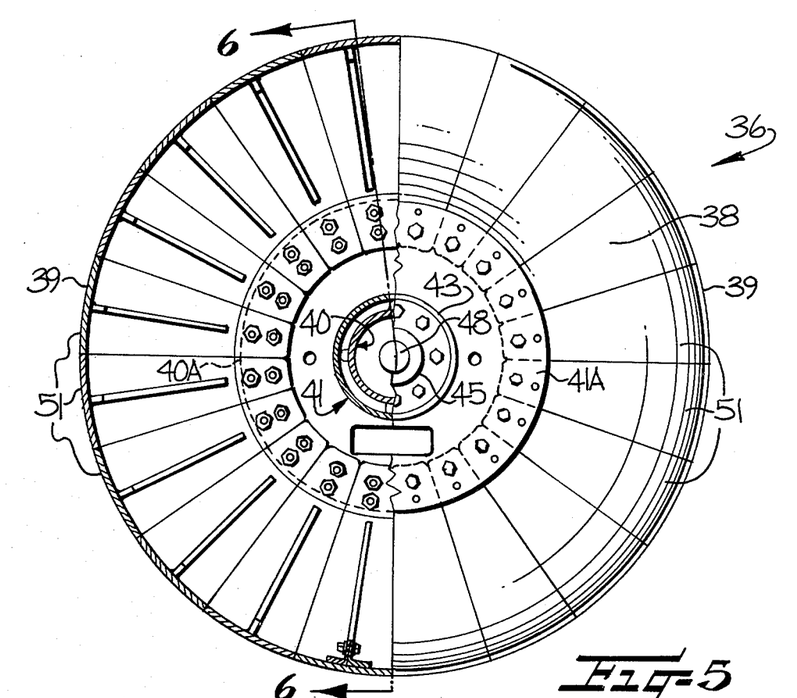
FIG. 5 is an elevation view, partially broken away, of certain of the apparatus components of FIG. 3 as assembled for use.
Figure 6:
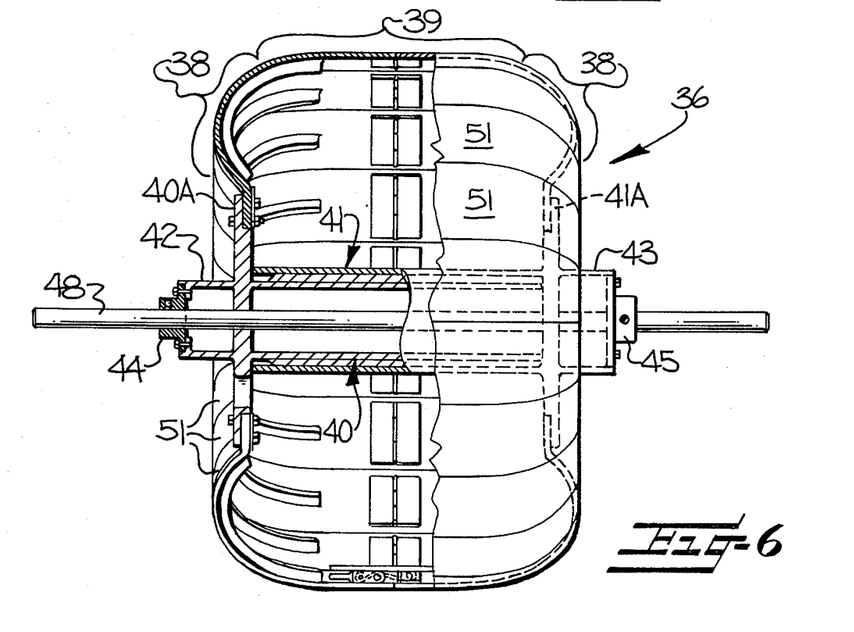
FIG. 6 is an elevation view, partially broken away, of the apparatus of FIG. 5, taken generally along the Line 5—5 in that figure.

In making a flexible sidewall flotation tire in accordance with the present invention, a tire carcass is built-up about the rigid mandrel of FIGS. 5 and 6 by applying thereto a plurality of layers of cord containing, unvulcanized elastomeric material sheet while arranging some of the layers with the cords therein directed generally radially of the sidewall surfaces 38 and axially of the main body surface 39 and arranging the remainder of the layers with the cords therein directed circumferentially of the main body surface 39. The built-up layers of the carcass are then supported on the rigid mandrel while the elastomeric material is subjected to elevated temperatures and pressures in an open pressure vessel to vulcanize the elastomeric material. As used herein, the term "open pressure vessel" is intended to refer to the absence of any mold enclosing the elastomeric material of the tire carcass and imparting a specific configuration or shape thereto during curing, as is conventional in the manufacture of vehicle tires. Such open pressure vessels and their use in vulcanizing elastomeric material have become well known in the relugging or rebuilding of heavy duty earth mover tires, and the interested reader not familiar with such vessels and their use is referred to available prior patents and publications for further information regarding that subject. Following curing of the tire, the rigid mandrel is removed from within the tire carcass.

Figures 7, 9:
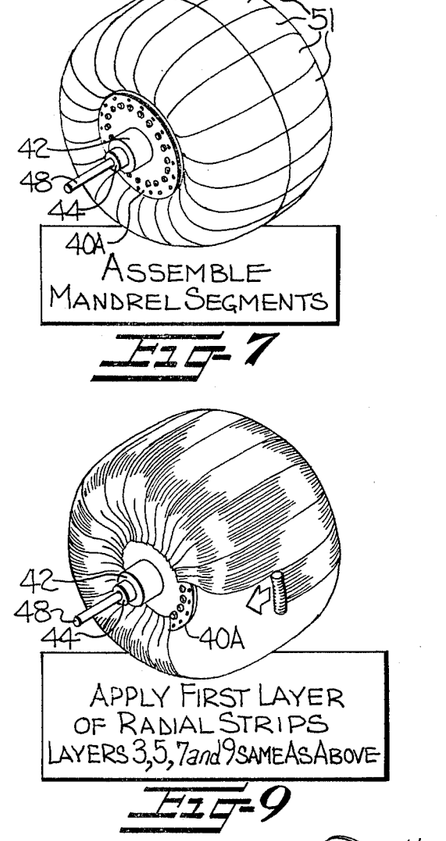
FIGS. 7 through 11 are partially perspective, partially schematic views illustrating certain steps in the method of the present invention.
Figures 8, 10:
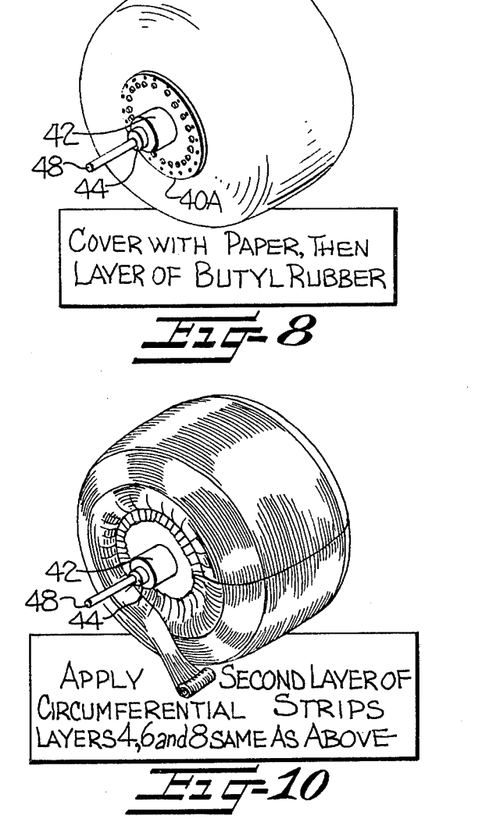

Referring now more particularly to FIGS. 7 through 20, the method of making a tire in accordance with the present invention begins with assembly of the mandrel segments (FIG. 7). In order to facilitate subsequent removal of the mandrel segments from within a completed tire, the rigid mandrel is first covered with a layer of paper. Where it is desired that the tire produced operate as a tubeless tire, the layer of paper is then covered with a layer of butyl rubber or other sealant material intended to impart the tubeless characteristic to the flotation tire in accordance with practices generally known to persons skilled in the arts of tire manufacture (FIG. 8). The plurality of layers of cord containing, unvulcanized elastomeric material sheet are then built-up about the rigid mandrel as generally indicated in FIGS. 9 and 10. In one tire constructed in accordance with the present invention, a total of nine plies of elastomeric material sheet are employed. In such a construction, plies 1, 3, 5, 7 and 9 are radially directed plies using twenty pieces of material in each ply. Each piece of material employed has a width of nine inches and contains rayon cords of 0.030 inches diameter. Those portions of the strips forming the sidewall portions have longitudinal side edge portions of adjacent strips lapped one over another in generally triangular "slice of pie" zones, converging radially outwardly. Such an arrangement of strips imparts desired carcass flexibility while strengthening the bead portions and imparting extended tire life in uses where the tire is mounted on an axle driven wheel. Plies 2, 4, 6 and 8 are circumferentially arranged, with the center of each such ply being formed by a twenty-two inch wide strip of a material containing rayon cords of 0.060 inch diameter. To each side of the center strip are applied side strips of an eight inch width, adjoined by further side strips of a six inch width, and further adjoined by six inch width side portions. In order to accommodate curvature of the mandrel in the region of transition between sidewall surfaces 38 and the main body surface 39, the strips of six inch width are cut transversely from the side edge closest to the sidewall surfaces 38, to permit overlapping of the cut portions into a somewhat triangular or "slice of pie" configuration. Each strip of material is carefully stitched or rolled into place as applied, in order to assure that air is removed from beneath the strips and sealing of overlapped portions is achieved prior to curing.

Figure 11:
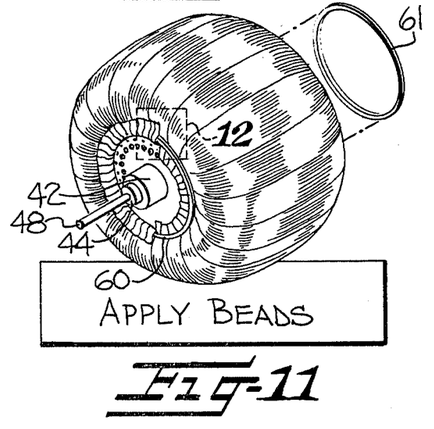

Following building up the desired number of plies, which may be more or less than the nine plies described above, circumferential beads are installed at the radial innermost portion of the sidewalls of the tire carcass under construction. While the manufacture and use of beads will be known generally to persons skilled in the applicable arts of tire manufacture and use, attention is particularly directed to FIGS. 11 and 12. As there shown, previously prepared bead elements 60, 61 are positioned adjacent the inner circumferential portions of the strips forming the radial plies, and "tail" portions of those strips are folded over the beads 60, 61. Each of the beads 60, 61 may be prepared in a manner known to persons skilled in the tire manufacturing arts but preferably is manufactured using a multiplicity of turns of a single wire with thin rubber strip interposed between successive layers of wire. In certain tires constructed in accordance with the present invention, the bead has been built-up with wire in layers of four turns, eight turns, twelve turns and twenty-two turns in order to provide a toroidal surface on the inner circumference of the bead, having a radius in cross section of approximately three eighths inch. Such a radius of curvature at the inner face of beads 60, 61 contributes to a more rounded area of contact between the bead and a wheel rim and lessens sharp bending of cord in the radial plies wrapped around the beads 60, 61.

Figure 12:
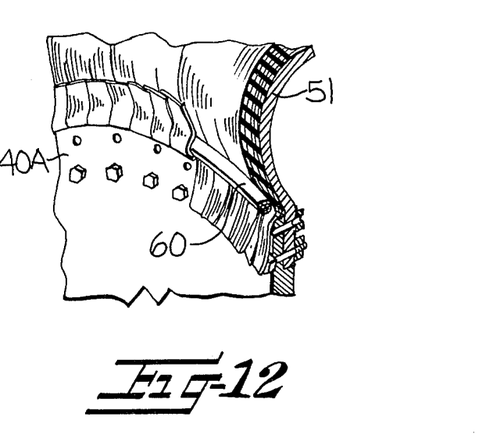
FIG. 12 is an enlarged portion of the perspective view of FIG. 11, clarifying certain details of a certain step in the method.

In order to accommodate wrapping of the radial plies about the beads 60, 61, each radial strip is cut into approximately thirds immediately adjacent the ends thereof. The outer thirds of the width of the strip are then cut back so as to end immediately adjacent the beads 60, 61 when inserted, leaving only the center third of width of the radial strip to be folded back and lapped radially over the bead (FIG. 12).

Figure 13:
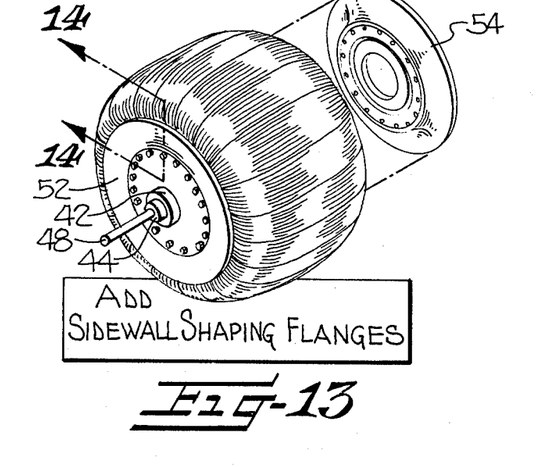
FIG. 13 is a view similar to FIGS. 7 through 11, illustrating a further step in the method of the present invention.
Figure 14:
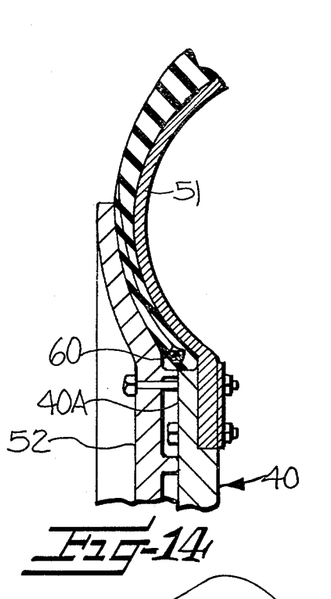
FIG. 14 is an enlarged sectional view through a portion of the structure shown in FIG. 13, taken generally along the Line 14—14 in that figure.

Following the application of the beads 60, 61 the sidewall shaping flanges 52, 54 are attached to the mounting axle means (FIG. 13). The flanges 52, 54 are configured so as to define, with the sidewall surfaces 38 of the segments 51, a volume for shaping the elastomeric material sheet into a predetermined tire carcass sidewall portion configuration (FIG. 14). Preferably, the sidewall shaping flanges 52, 54 are drilled with air vent openings so as to permit any air entrapped with the elastomeric material to escape. Further, the sidewall shaping flanges 52, 54 are secured in engagement with the flanges 40A, 41A of the male and female members 40, 41 by fasteners which also penetrate through corresponding segments 51 (FIG. 14). The flanges compress the elastomeric material in the area of the beads and sidewalls, causing the rubber to densify and flow under cure so as to strengthen the bead portions.

Figure 15:
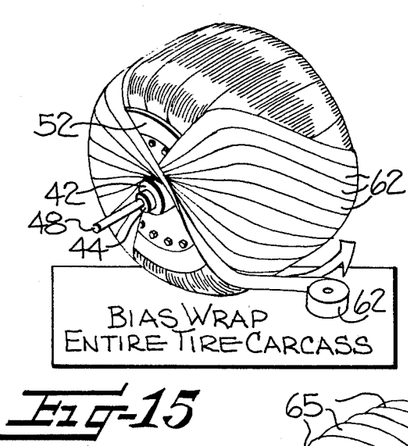
FIGS. 15 through 18 are views similar to FIGS. 7 through 11 and 13, illustrating further steps in the method in accordance with the present invention.
Figure 16:
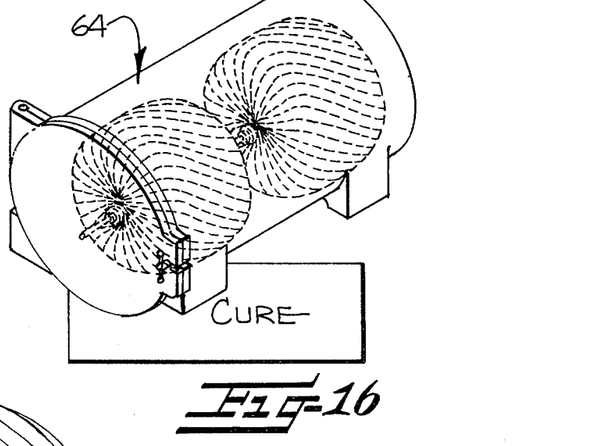

In order to exert on the built-up tire carcass of unvulcanized material forces restraining the strip material from unwinding, the tire carcass is bias wrapped with an appropriate binding material prior to curing (FIG. 15). Preferably, the bias wrapping is of a fabric strip 62 having the characteristic of shrinking when exposed to curing temperatures, and suitably may be a woven fabric of nylon. A metal liner may be applied under the fabric wrapping should the marking otherwise resulting be deemed detrimental to tire appearance. As so wrapped, the tire carcass is placed into a suitable pressure vessel as generally indicated at 64 in FIG. 16, to which steam is admitted to subject the wrapped tire carcass to elevated temperatures and pressures. The temperature and pressure conditions to which the tire carcass is subjected are selected, as known to persons skilled in the applicable arts, so as to vulcanize the elastomeric material of the carcass.

Figure 2:
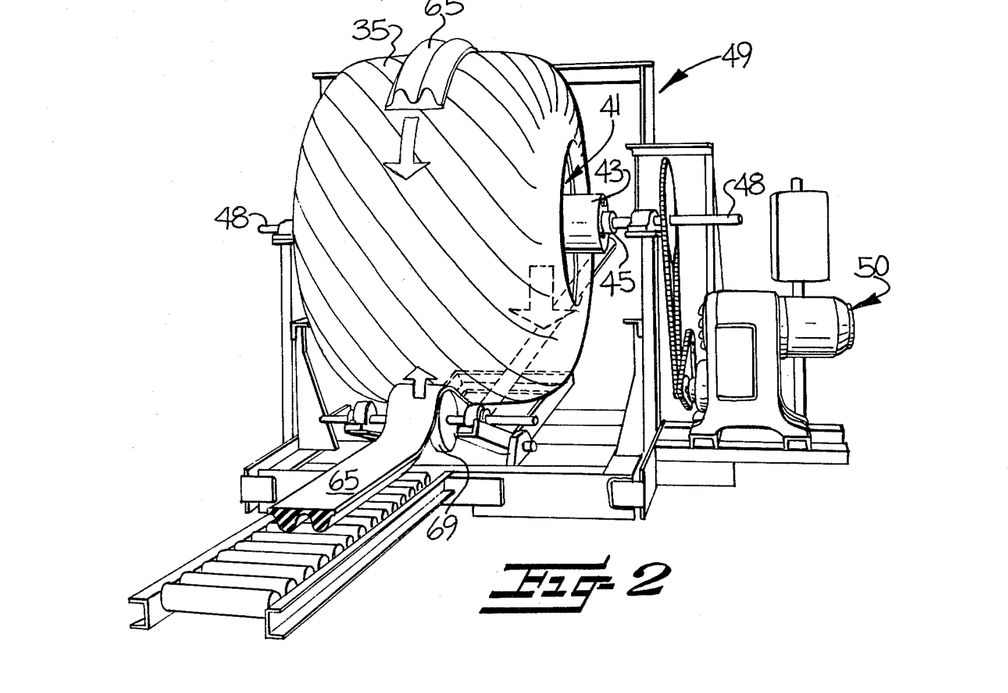
FIG. 2 is a perspective view of the tire of FIG. 1 at one particular point in the making of the tire.
Figure 3:
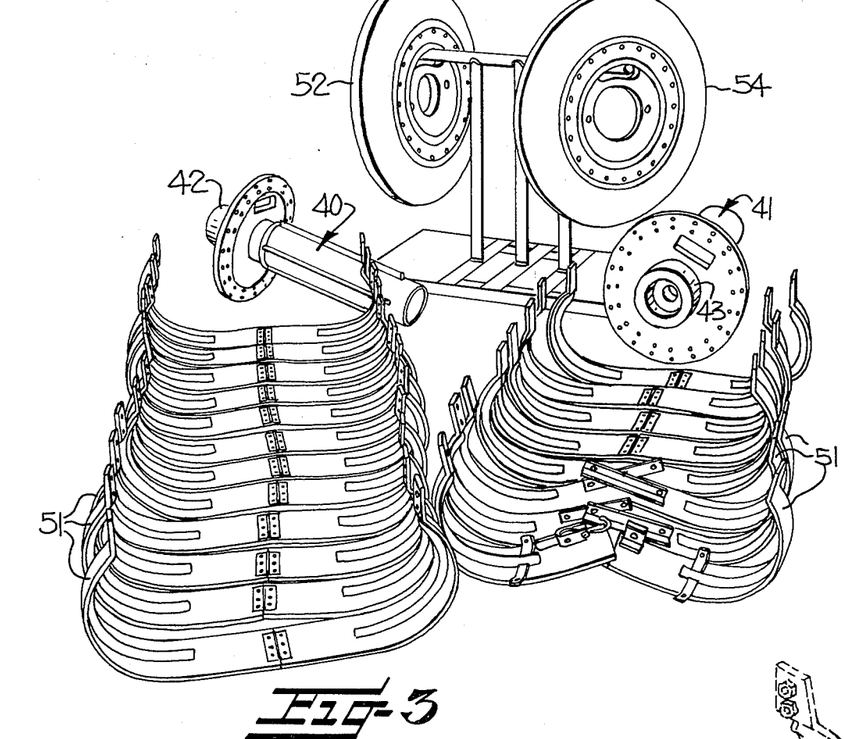
FIG. 3 is a perspective view of certain components of the apparatus employed in making the tire of FIGS. 1 and 2.
Figure 17:
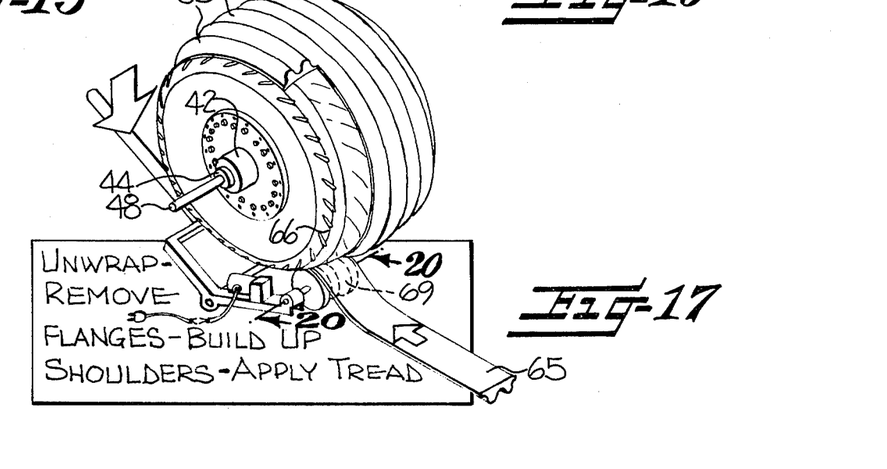
Figure 19:
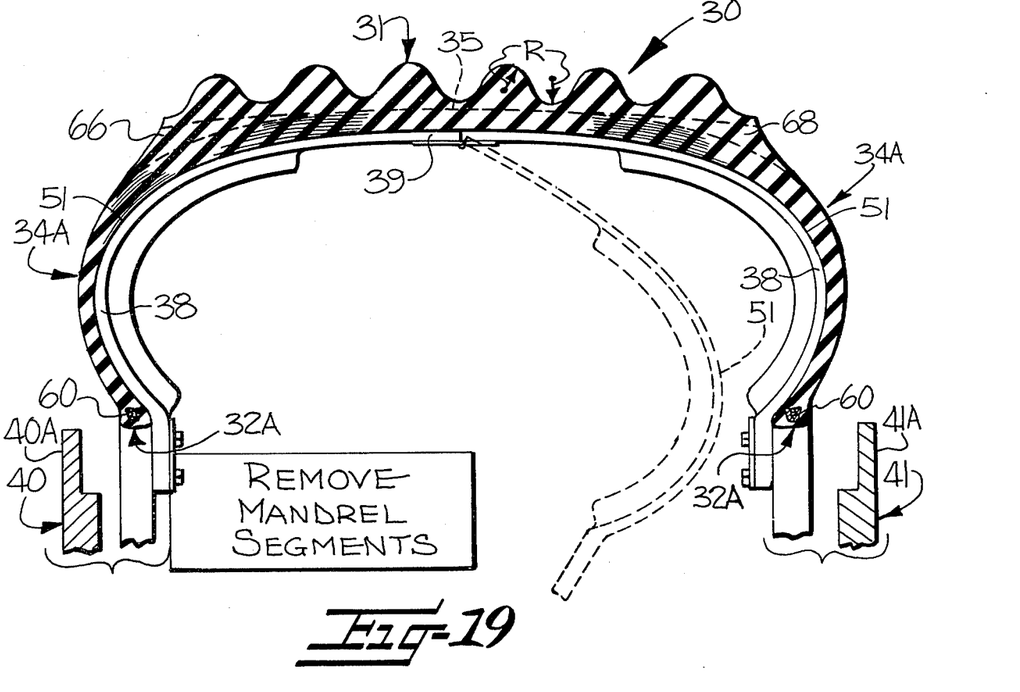
FIG. 19 is an enlarged sectional view bearing some similarity to FIGS. 7 through 11, 13 and 15 through 18.
Figure 20:
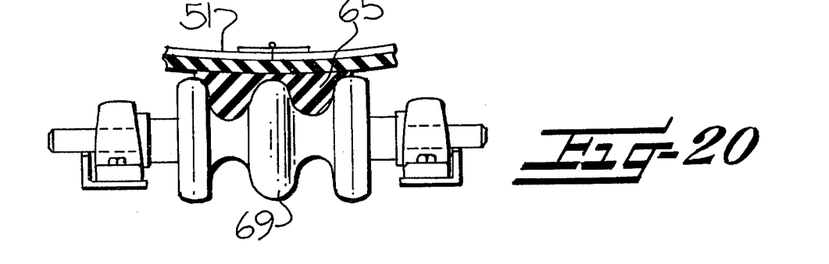
FIG. 20 is an enlarged elevation view, partially in section, taken generally as indicated by the Line 20—20 in FIG. 17.

In order to apply the tread 31 to the tread supporting surface 35 of the tire carcass, tread strip material is prepared and applied as generally indicated in FIGS. 2, 17 and 20. In the form illustrated, the tread material takes the form of an elongate strip 65 having a pair of projecting ribs, a valley therebetween, and wings extending laterally. As particularly illustrated, three such strips 65 are positioned side by side encircling the tread supporting surface 35 of the tire carcass. Additionally, and in order to assure a substantially flat footprint, shoulder strips 66, 68 (FIG. 19) may be applied beneath the outer wings of the outer strips 65.

In installing the strips 65, the strips preferably are rolled onto the tire carcass by means of a contoured stitching roller 69 (FIGS. 17 and 20) closely engaging the ribs, valleys and wings of the strips 65.

The circumferential or hoop treads provided by the strips 65 and the particular cross sectional configuration thereof impart desirable characteristics to the flotation tire of the present invention. More particularly, it will be noted that the circumferential ribs formed by the strips 65 are curvilinear in cross sectional configuration, having convex semi-circular or "crowned" portions and reversed concave semi-circular valleys between the projecting ribs and of substantially the same width. In use, the curvilinear characteristic of the treads, in cross section, and particularly the semi-circular configuration thereof, sweeps a limited amount of material over which the tire passes into the pockets formed by the curvilinear valleys between adjacent ribs. This effect contributes, at least in part, to the ability of the tire of the present invention to pass over growing agricultural crops without damage to the crops. This action has been observed with treads of the type described in which the radius of the semi-circular portions (R in FIG. 19) has been approximately two inches, but it is contemplated that the specific radius chosen may vary with the overall size of the tire. Further, the circumferential or hoop characteristic of the tread avoids lifting of loose soil and the like which would otherwise result in displacement and loss of soil particles. Such a soil lifting effect, as occurs with any transverse rib of conventional trapezoidal or rectangular cross sectional configuration, will be appreciated as contributing to damage of certain supporting surfaces over which the tire of the present invention may pass, such as arctic tundra. Finally, the alternate ribs and valleys contribute to a larger bearing area in loose soils and the like, enhancing the flotation effect.

Figure 18:
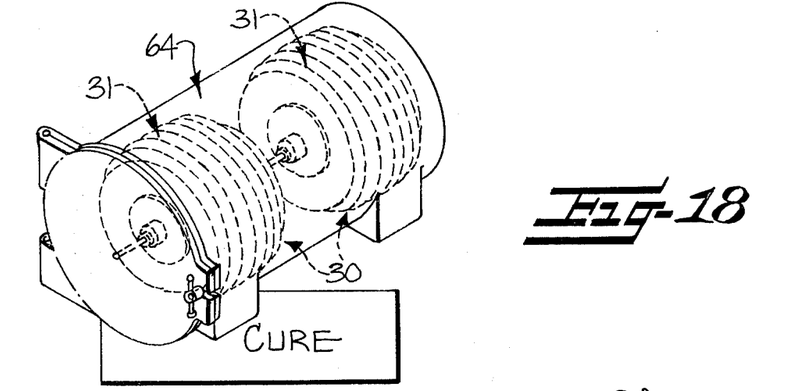

Following application of any shoulder materials employed and the encircling tread strips, the tires again return to the pressure vessel 64 for curing and bonding together of the tread strips and carcass (FIG. 18). Persons familiar with the applicable arts of tire manufacture will be aware of variations which may be employed in these steps of the method in accordance with the present invention and relating to application of uncured or cured tread materials to an uncured or previously cured tire carcass construction. While it is deemed preferable, in the present invention, to apply uncured tread strips to a previously cured tire carcass, it is recognized that other approaches may be deemed to be acceptable alternatives by others practicing the present invention.

Following completion of curing of the tire, the mandrel segments are removed from within the completed tire by unbolting and separating the male and female portions 40, 41 of the mounting axle means, removing the key mandrel segments, and then removing the remaining mandrel segments.

In the drawings and specification, there has been set forth a preferred embodiment of the invention, and although specific terms are employed, they are used in a generic and descriptive sense only and not for purposes of limitation.

That which is claimed is:

1. A flexible sidewall flotation tire comprising:
   a tread for engaging a traction surface; and
   a carcass for supporting said tread and having
   a pair of spaced bead portions for engaging a rim,
   a pair of sidewall portions extending from respective bead portions for imparting flexibility to the tire, and
   a tread bearing portion extending between said sidewall portions for supporting said tread;
   each of said sidewall portions being defined by a plurality of built-up superposed layers of cord containing elastomeric material sheet with the layers arranged with cords therein directed generally radially from said bead portions; each of said layers defining each of said sidewall portions being formed by a plurality of elongate strips of sheet with longitudinal side edge portions of adjacent strips lapped one over another in generally triangular zones converging radially outwardly of said sidewall portions;
   said tread bearing portion being defined by a plurality of built-up superposed layers of cord containing elastomeric material sheet with some layers arranged with cords therein directed circumferentially about said carcass and the remainder of said layers arranged with cords therein crossing circumferential cords at a right angle.

2. A tire according to claim 1 wherein said layers of said sidewall portions and of said tread bearing portion alternate between layers arranged with cords directed circumferentially and layers arranged with cords crossing circumferential cords at right angles.

3. A tire according to claim 1 wherein each of said layers of said sidewall portions and of said tread bearing portion comprises a plurality of elongate strips of sheet with longitudinal side edge portions of adjacent strips lapped one over another.

4. A tire according to claim 1 wherein each of said layers defining each of said sidewall portions comprises a plurality of elongate strips of sheet having predetermined widths and further wherein each of said bead portions comprises a generally circular wound body of metallic wire, each of said strips of sheet having a widthwise medial portion thereof lapped radially about said wire body.

5. A tire according to claim 1 wherein said tread comprises a plurality of circumferential ribs spaced one from another by circumferential valleys, said ribs and said valleys having substantially the same width.

6. A tire according to claim 5 wherein said ribs and said valleys are semi-circular in cross sectional configuration and are formed at substantially the same radius.

* * * * *